US007702010B2

(12) United States Patent
Proano et al.

(10) Patent No.: US 7,702,010 B2
(45) Date of Patent: *Apr. 20, 2010

(54) SYSTEM FOR MONITORING THE QUALITY OF A COMMUNICATIONS CHANNEL WITH MIRROR RECEIVERS

(75) Inventors: Jay Proano, Rancho Santa Margarita, CA (US); Howard Baumer, Laguna Hills, CA (US); Chung-Jue Chen, Irvine, CA (US); Ali Ghiasi, Cupertino, CA (US); Vasudevan Parthasarathy, Irvine, CA (US); Rajesh Satapathy, Lake Forest, CA (US); Linda Ying, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/071,138

(22) Filed: Feb. 15, 2008

(65) Prior Publication Data
US 2008/0212665 A1 Sep. 4, 2008

Related U.S. Application Data

(63) Continuation of application No. 10/767,748, filed on Jan. 30, 2004, now Pat. No. 7,333,537.

(51) Int. Cl.
*H04B 3/46* (2006.01)
*H04B 17/00* (2006.01)
(52) U.S. Cl. .................. 375/227; 375/226; 375/228
(58) Field of Classification Search ......... 375/224–228, 375/316, 340, 346, 349
See application file for complete search history.

(56) References Cited

U.S. PATENT DOCUMENTS

| 6,094,740 | A | 7/2000 | Boccuzzi et al. |
| 6,990,418 | B2 | 1/2006 | Blanc et al. |
| 7,333,537 | B2* | 2/2008 | Proano et al. ............... 375/228 |
| 7,339,986 | B2* | 3/2008 | Proano et al. ............... 375/227 |
| 2003/0164724 | A1* | 9/2003 | Momtaz et al. ............. 327/165 |
| 2005/0188284 | A1 | 8/2005 | Proano et al. |

OTHER PUBLICATIONS

Agrawal, G.P., "Fiber-Optic Communication Systems," John Wiley & Sons, Inc., New York, NY, pp. 153, 154, and 176-180 (1992).

* cited by examiner

*Primary Examiner*—David B Lugo
(74) *Attorney, Agent, or Firm*—Sterne, Kessler, Goldstein & Fox, P.L.L.C

(57) ABSTRACT

A system is presented that monitors the quality of a communications channel with mirror receivers. A first receiver and a second receiver, coupled in parallel with the first receiver, receive a data signal transmitted over the communications channel. The second receiver generates an output signal. A signal integrity (SI) processor manipulates the output signal in order to determine the quality of the communications channel. The SI processor samples a phase-shifted version of the output signal, which has a phase shifted relative to a zero reference phase, and analyzes the phase-shifted version of the output signal for bit errors. In an embodiment, the SI processor manipulates the output signal to extract an eye diagram indicative of the quality of the communications channel. The SI processor non-intrusively determines the quality of the communications channel using the second receiver.

12 Claims, 5 Drawing Sheets

SYSTEM FOR MONITORING THE QUALITY OF A COMMUNICATIONS CHANNEL WITH MIRROR RECEIVERS

CROSS-REFERENCE TO RELATED APPLICATIONS

This Application is a continuation of U.S. patent application Ser. No. 10/767,748, filed Jan. 30, 2004, which is incorporated herein by reference in its entirety.

BACKGROUND OF THE INVENTION

1. Field of the Invention

The present invention is related to systems for monitoring the quality of a communications channel.

2. Related Art

Communications systems can have backend data storage mechanisms of various configurations. For example, in a direct-attached storage configuration, a server is directly connected to a data storage device. The server is connected with one or more clients on a Local Area Network (LAN) and controls client access to the data storage device. In a network-attached storage configuration, one or more servers are connected with one or more clients on a LAN. The servers interface with a control device, which regulates access to one or more data storage devices. The control device typically performs intelligent processing in order to connect data storage devices onto various server paths.

The performance of communications networks typically degrades over time between system calibrations. A problem with control devices of typical network-attached data storage configurations is they provide minimal, if any, communications channel quality monitoring. What is needed, therefore, is a system for monitoring the quality of a communications channel, particularly for communications systems having a network-attached data storage configuration.

SUMMARY OF THE INVENTION

The present invention is directed to a system for monitoring, with minimal additional hardware, the quality of a communications channel, for example, in a communications system having a network-attached data storage configuration. In an embodiment of the present invention, the system includes mirror receivers. A first receiver receives a data signal transmitted over the communications channel. A second receiver, coupled in parallel with the first receiver, receives the data signal and generates an output signal.

A signal integrity (SI) processor manipulates the output signal of the second receiver in order to estimate the quality of the communications channel. The SI processor samples a phase-shifted version of the output signal, which has a phase shift relative to a zero reference phase, and analyzes the phase-shifted version of the output signal for bit errors. The SI processor non-intrusively estimates the quality of the communications channel using the second receiver.

In an embodiment of the present invention, the system for monitoring the quality of a communications channel further includes a phase acquisition module coupled in communication with the SI processor. When triggered by the SI processor, the phase acquisition module locks onto a phase of the output signal in order to establish the zero reference phase. A phase shifting module is coupled in communication with the phase acquisition module and the SI processor. When triggered by the SI processor, the phase shifting module generates a phase-shifted version of the output signal having a phase shifted relative to the zero reference phase.

In an embodiment, additional features of the present invention include a Link Integrity (LI) processor coupled in communication with the SI processor. The LI processor detects link-level errors in the output signal and aids the SI processor in estimating the quality of the communications channel. A bit error testing module compares bits of the phase-shifted version of the output signal to a pattern signal in order to detect bit errors. A module coupled in communication with the SI processor enables a system operator to visualize the relative quality of the communications channel by generating an eye diagram extracted by the SI processor from the output signal.

Further features and advantages of the invention, as well as the structure and operation of various embodiments of the invention, are described in detail below with reference to accompanying drawings. It is noted that the invention is not limited to the specific embodiments described herein. Such embodiments are presented for illustrative purposes only. Additional embodiments will be apparent to persons skilled in the relevant arts based on the teachings contained herein.

BRIEF DESCRIPTION OF THE DRAWINGS/FIGURES

The present invention will be described with reference to the accompanying drawings. The drawing in which an element first appears is typically indicated by the leftmost digit(s) in the corresponding reference number.

DETAILED DESCRIPTION OF THE INVENTION

Overview

The present invention is directed to a system for monitoring the quality of a communications channel, for example, in a communications system having a network-attached data storage configuration. In the detailed description that follows, the preferred embodiments of the present invention are presented in detail. While specific features, configurations, and devices are discussed in detail, this description is for illustrative purposes, and persons skilled in the art will recognize that other configurations and devices can be used to achieve the features of the present invention without departing from the scope and spirit thereof.

Example Environment

Figure 1:
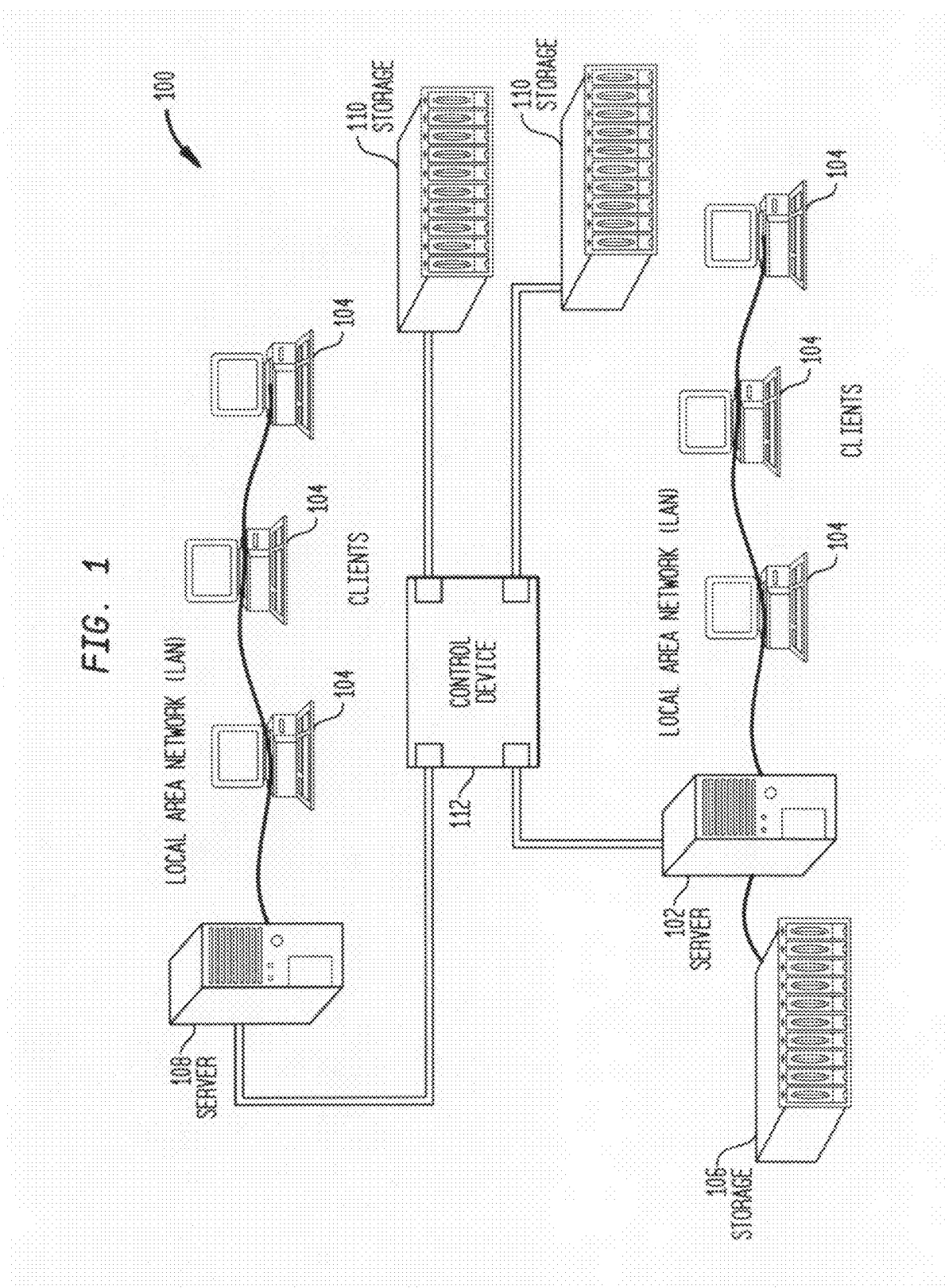
FIG. 1 illustrates an example environment in which the present invention can be used.

Before describing the present invention, it is helpful to describe an example environment in which the invention can be used. FIG. 1 illustrates an example environment in which the present invention can be used. Communications systems typically have backend data storage mechanisms, which can have various configurations. For example, communications system 100 has a server 102 directly connected to a data storage device 106 in direct-attached storage configuration. Server 102 is connected with one or more clients 104 on a Local Area Network (LAN) and controls client 104 access to data storage device 106.

Communications system 100 also has a server 108, which in addition to server 102, is connected to data storage devices 110 in a network-attached storage configuration. Servers 102 and 108 are connected on LANs with one or more clients 104 and interface with a control device 112, which regulates access to data storage devices 110. Control device 112 typically performs intelligent processing in order to connect data storage devices 110 onto various server paths. In accordance with an embodiment of the present invention, control device 112 can include a system for monitoring the communications channel quality in order to alert a system operator to problems in communications system 100.

Monitoring Communications Channel Quality using Eye Diagrams

Figure 2A:
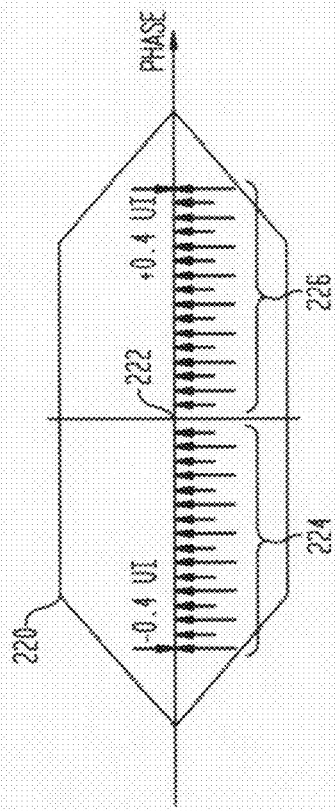
FIG. 2A illustrates a comparison of an ideal eye diagram to a degraded eye diagram.

FIG. 2A illustrates a comparison of an ideal eye diagram 200 to a degraded eye diagram 210. An eye diagram is formed by superimposing electrical pulses corresponding to different transmitted data signal bits, and visually represents the quality of a communications channel through which the data signal is transmitted. For example, ideal eye diagram 200 of FIG. 2A has a wide eye opening 202, which is indicative of a low noise, high quality communications channel. In ideal eye diagram 200, the signal level difference between different signal bits is a maximum.

Degraded eye diagram 210 of FIG. 2A has a partially closed eye opening 212, which is indicative of a noisy, low quality communications channel. In degraded eye diagram 210, the signal level difference between different signal bits is minimal as compared to ideal eye diagram 200. A distorted eye diagram, such as degraded eye diagram 210 of FIG. 2A, alerts a system operator to problems in the communications system. Communications system problems such as chirped pulses, noise in the circuit board or transmission medium, and aging of the communications system components are manifested in an eye diagram and can cause the eye opening to narrow.

Given an eye diagram indicative of the quality of a communications channel, a phase position corresponding to the maximum opening of the eye is the best phase, due to minimum possible noise tolerance, at which to sample a signal transmitted through the channel. At the center of the eye opening, the signal level difference between two different signal bits is a maximum, but at the edges of the eye opening, the signal level difference between two different signal bits is minimal. Accordingly, the likelihood that a receiver will detect a signal bit in error is low for sampling phase positions near the center of the eye opening and increases rapidly for sampling phase positions farther from the center of the eye.

Figure 2B:
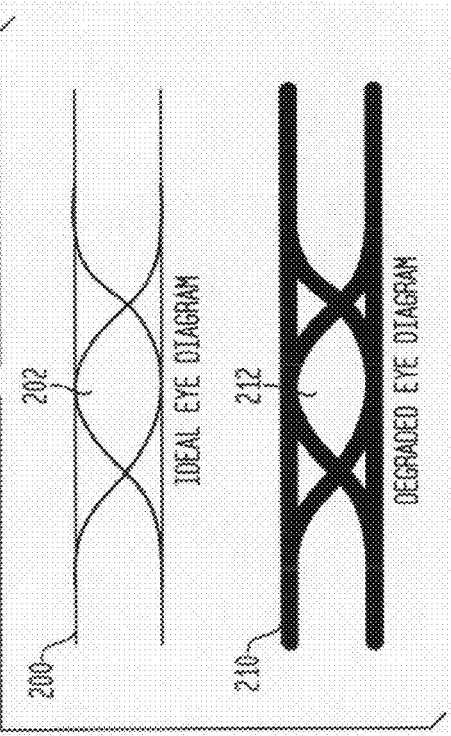
FIG. 2B illustrates an eye diagram having multiple phase sampling points to the left and right of the center of the eye.

In accordance with the present invention, an eye opening for a communications channel can be characterized by estimating a bit error rate (BER) for various phase sampling positions in the eye diagram of a received signal. FIG. 2B illustrates an example eye diagram 220 having a number of phase sampling positions 224 to the left of a center 222 of eye 220 and a number of phase sampling positions 226 to the right of center 222. The invention is not, however, limited to these example phase sampling positions or number of phase positions. Based on the description herein, one skilled in the relevant art(s) will understand that the invention can be implemented with other phase sampling positions and numbers of phase positions. In order to characterize the quality of a communications channel, the number of bit errors in the received data signal at each of the phase sampling positions and the total number of bits sampled can be accumulated, which in turn can be used to estimate a BER.

Figure 2C:
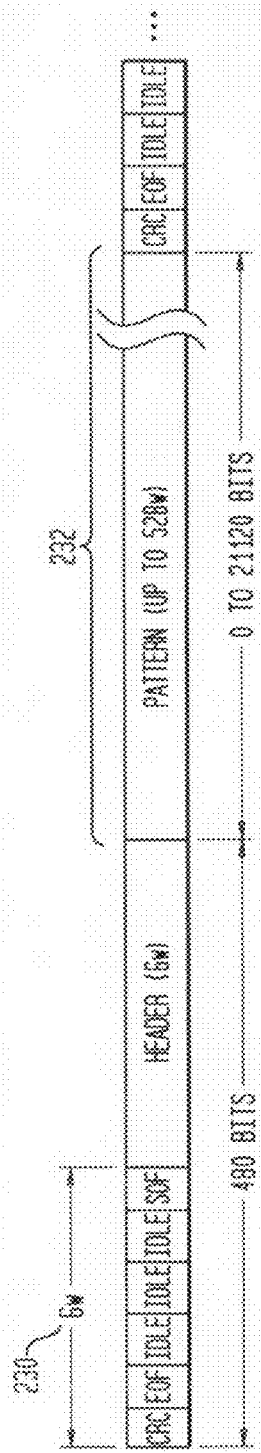
FIG. 2C illustrates an example structure of a Fibre Channel frame having a fixed pattern that can be used for estimating a bit error rate for various phase-shift positions in an eye diagram of a received data signal.

In order to perform bit-by-bit error detection at the receiver, a host continuously transmits signal frames containing a pre-defined repeated bit pattern. For example, FIG. 2C illustrates an example structure of a Fibre Channel frame 230 having a fixed 40-bit repeated pattern 232 that can be used for estimating a BER for various phase-shift positions in an eye diagram of a received data signal. The invention is not, however, limited to the example of a Fibre Channel network protocol. Based on the description herein, one skilled in the relevant art(s) will understand that the invention can be implemented with other network protocols. Bit-by-bit error detection at the signal level permits more precise evaluation of the quality of a communications channel than word or frame error detection at the link level.

Active Link Integrity/Signal Integrity Method of Monitoring Channel Quality

Figure 3:
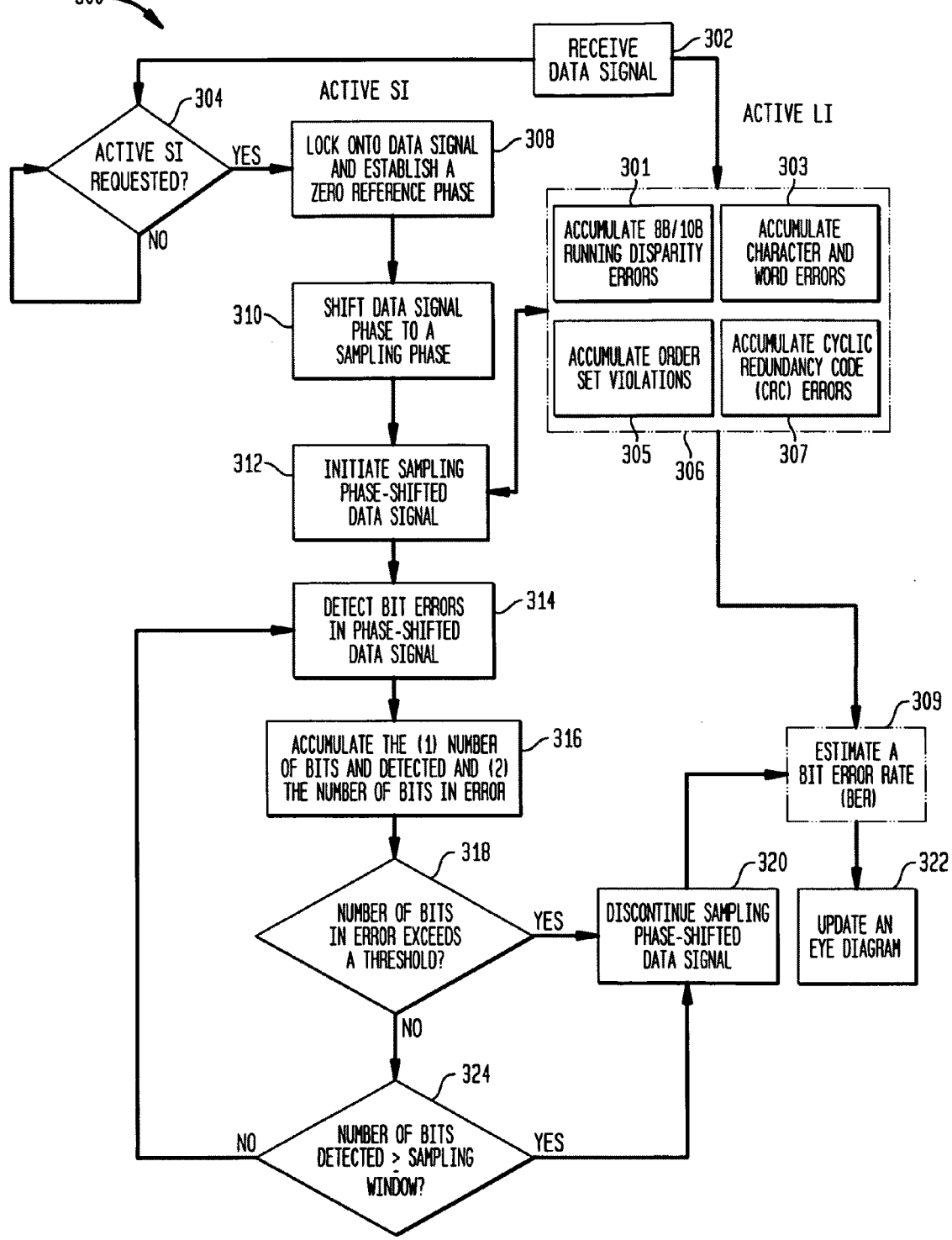
FIG. 3 illustrates a process flow chart of a method for monitoring communications channel quality, in accordance with an embodiment of the present invention.

FIG. 3 illustrates a process flow chart of a method for monitoring channel quality 300, in accordance with an embodiment of the present invention, referred to herein as Active Link Integrity/Signal Integrity ("Active LI/SI") analysis. In step 302, a data signal is received. In an embodiment of the present invention, Active Link Integrity ("Active LI") analysis is automatically performed in step 306.

In step 306, the received data signal is analyzed for link-level errors. Step 306 shows four example link-level errors, which reflect an approximate number of bit errors in the received data signal: 8-bit/10-bit running disparity errors 301, character and word errors 303, order set violations 305, and cyclic redundancy code errors 307. The invention is not, however, limited to the detection and accumulation of these example link-level errors. Based on the description herein, one skilled in the relevant art(s) will understand that the invention can be implemented to detect and accumulate other link-level errors.

In step 309, a bit error rate (BER) can be estimated according to accumulated link-level errors. In an embodiment, step 309 is implemented in firmware, independent of method 300 steps shown in FIG. 3. While accumulated 8-bit/10-bit running disparity errors 301 can be used to estimate a BER, they are preferably used as a warning mechanism. Also, BERs higher than approximately $10^{-6}$ are not reliably estimated by accumulated CRC errors 307, and BERs higher than approximately $10^{-3}$ are not reliably estimated by accumulated order set violations 305.

Accordingly, Active LI analysis provides a gross characterization of the quality of a communications channel. An advantage of Active LI analysis is a host is not required to continuously send data signal frames containing a pre-defined repeated pattern; therefore, Active LI can be performed on a received data signal under normal operating conditions. Additionally, Active LI analysis does not disturb the received data signal in order to characterize the quality of a communications channel.

To obtain a more accurate characterization of the quality of a communications channel, a system operator can request Active Signal Integrity ("Active SI") analysis in step 308. In an embodiment of the present invention, Active SI is not automatically performed because Active SI analysis manipulates the received data signal in order to characterize the quality of a communications channel.

In step 308, a zero reference phase is established by determining the center 222 of eye 220 of FIG. 2B. In step 310 of FIG. 3, the phase of the received data signal is shifted to a sampling phase, producing a phase-shifted data signal. For example, a sampling phase can be one of the thirty-two phase sampling positions 224 and 226 shifted to the left or right of center 222 of eye 220 of FIG. 2B, respectively. Active SI analysis disrupts the received data signal by shifting the received data signal phase in order to sample at different phase positions in the eye diagram of the received data signal.

In step 312 of FIG. 3, Active SI analysis initiates sampling the phase-shifted data signal. As shown in FIG. 3, the phase-shifted data signal can simultaneously be analyzed in step 306 according to Active LI analysis. Active LI analysis aids Active SI in synchronization. In step 314, Active SI analyzes the phase-shifted data signal bit-by-bit for bit errors. As described above in conjunction with FIG. 2C, Active SI requires that a host send data signal frames containing a pre-defined pattern signal in order to detect phase-shifted data signal bits in error. In step 316 of FIG. 3, a number of phase-shifted data signal bits are detected and a number of phase-shifted data signal bits in error are accumulated.

In step 318, the accumulated number of bits detected in error is compared to an error threshold. If the accumulated number of bits in error exceeds the error threshold, then sampling is discontinued in step 320. Otherwise, in step 324, the accumulated number of bits detected is compared to a sampling window duration, which can be expressed as a number of bits. If the accumulated number of bits detected is less than the duration of the sampling window, then bit error detection resumes in step 314. When the accumulated number of bits detected equals or exceeds the duration of the sampling window, sampling is discontinued in step 320.

In step 309, a BER is estimated according to the accumulated number of bits in error relative to the accumulated number of bits detected. In an embodiment, step 309 can be implemented in firmware, independent of method 300 steps shown in FIG. 3, as described above. In step 322 an eye diagram is updated according to the BER estimated in step 310. As described above in conjunction with FIG. 2A, a system operator can visually assess the quality the communications channel according to the degree of eye opening. For example, a wide eye opening, such as eye opening 202 of FIG. 2A, indicates a low noise, high quality communications channel. A partially closed eye opening, such as eye opening 212 of FIG. 2A, indicates a noisy, poor quality communications channel.

Adaptive Active LI/SI Method of Monitoring Channel Quality

Noise in a communications system, such as sinusoidal jitter, introduces limitations on sampling window duration and the number of sampling phase positions that can be implemented with Active LI/SI method 300 of FIG. 3. The presence of high sinusoidal jitter in a communications system requires a short duration sampling window, otherwise the high jitter can cause the system to lose its lock on the received data signal. However, estimating higher BERs requires a long duration sampling window.

Figure 4:
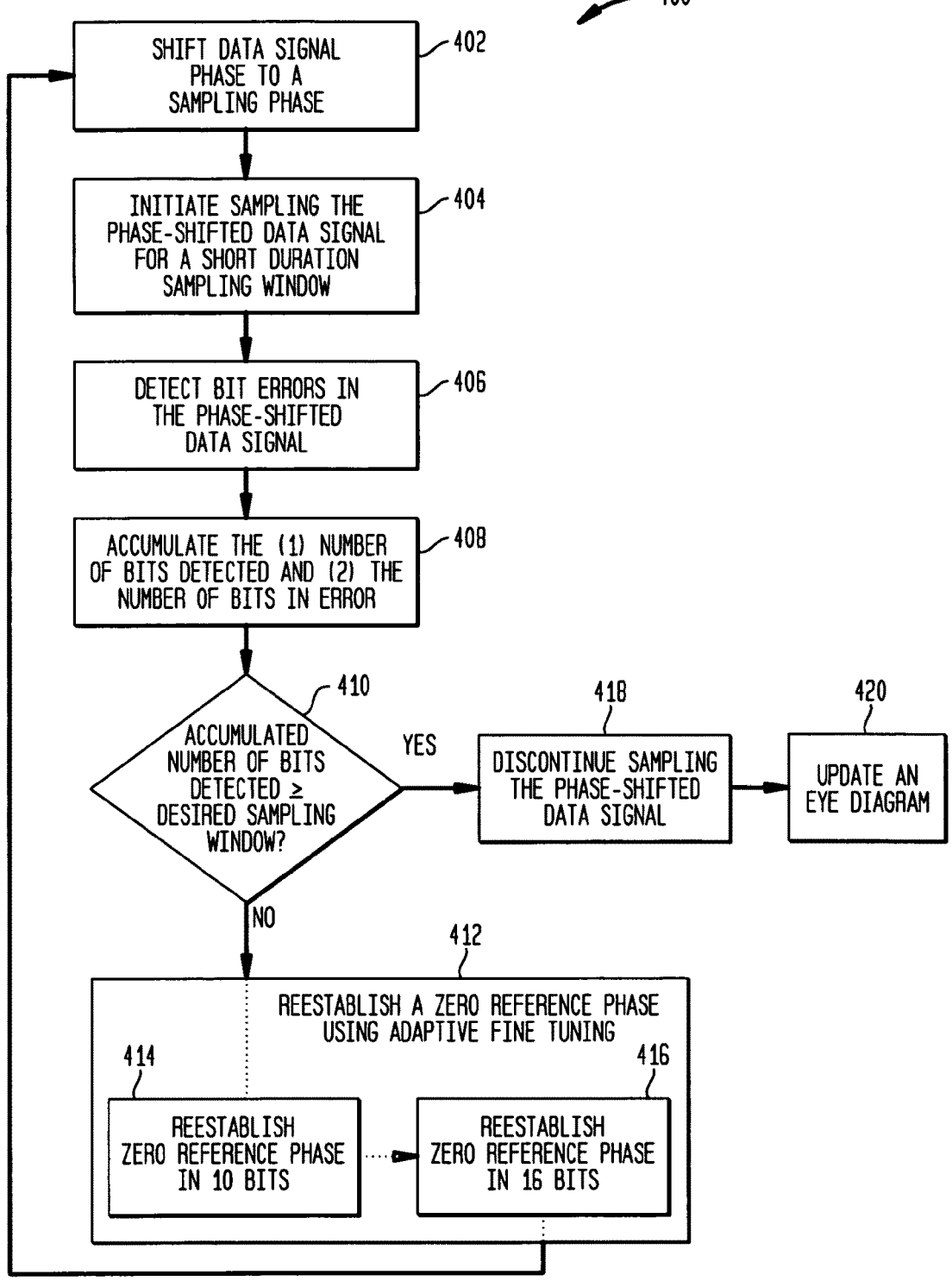
FIG. 4 illustrates a process flowchart of phase camping and adaptive fine-tuning features of the method of FIG. 3, in accordance with embodiments of the present invention.

FIG. 4 illustrates a process flowchart of phase camping and adaptive fine-tuning features of Active LI/SI method 300 of FIG. 3, in accordance with embodiments of the present invention. In FIG. 4, a long duration sampling window is achieved by sampling the phase-shifted data signal for multiple short duration sampling windows. This process is referred to herein as phase camping.

In step 402, a phase of the received data signal is shifted to a sampling phase position. In step 404, sampling is initiated for a short duration sampling window. In step 406, the phase-shifted data signal is analyzed for bit errors. In step 408 a number of bit errors and a number of bits detected are accumulated. In step 410, the accumulated number of bits detected is compared to the duration of a desired sampling window. If the accumulated number of bits detected exceeds the duration of the desired sampling window, sampling is discontinued in step 418 and the eye diagram is updated in step 420. Otherwise, the zero reference phase is reestablished in step 412 before sampling is resumed in step 404 for an additional short duration sampling window. In other words, in step 412, the center of the eye diagram is re-determined. By reestablishing the zero reference phase between the multiple short duration sampling periods, the phase camping feature of method 400 increases the likelihood that synchronization can be maintained in the presence of high sinusoidal jitter or other noise in the communications channel. In an embodiment of the present invention, a random delay is introduced between samples, after the zero reference phase is reestablished.

Step 412 also illustrates a feature of method 400 that substantially reduces the amount of time required to reestablish the zero reference phase, in accordance with an embodiment of the present invention. This method is referred to herein as adaptive fine-tuning. For example, in step 414, a first shift from the sampling phase to the zero reference phase, which corresponds to center 222 of eye 220 of FIG. 2B, is accomplished with 10-bit adaptive feedback control signal accuracy. First shift 414 is a gross estimation of center 222 of eye 220 of FIG. 2B. In step 416, a second shift from the reference phase established in step 414 to the zero reference phase is accomplished with 16-bit accuracy. A single shift from the sampling phase to the zero reference phase with 16-bit accuracy would require significantly more time than the combination of gross-estimation shift 414 and fine-estimation shift 416. The invention is not, however, limited to these example values of gross and fine tuning bit accuracy (e.g., depending on the implementation, the gross tuning step could use ten to twelve bits and the fine tuning step could use fourteen to sixteen bits). Based on the description herein, one skilled in the relevant art(s) will understand that the invention can be implemented with other values of gross and fine tuning bit accuracy.

As described above, sinusoidal jitter in a communications system limits both sampling window duration and the number of sampling phase positions that can be implemented with Active LI/SI method 300 of FIG. 3. Example values of maximum sampling window duration and number of sampling phase positions for a high sinusoidal jitter communications system are 500 bits and seven phase sampling positions (three to the left of center 222 of eye 220 of FIG. 2B, center 222, and three to the right of center 222), respectively. Example values of maximum sampling window duration and number of sampling phase positions for a low sinusoidal jitter communications system are 32000 bits and seventeen sampling phase positions (eight to the left of center 222 of eye 220 of FIG. 2B, center 222, and eight to the right of center 222), respectively. The invention is not, however, limited to these example sampling window durations and numbers of phase sampling positions. Based on the description herein, one skilled in the relevant art(s) will understand that the invention can be implemented with other sampling window durations and numbers of phase sampling positions.

In an embodiment of the present invention, algorithms that determine Active LI/SI operating parameters can be implemented in firmware, independent of method 300 steps shown in FIG. 3. Such Active LI/SI operating parameters include: a quantity of phase sampling positions to analyze, which phase sampling positions to analyze, which pre-defined data pattern to transmit, the maximum duration of a sampling window, and a bit error threshold. In another embodiment, a system operator can select the Active LI/SI operating parameters individually or select programs of pre-defined operating parameters according to assessed channel conditions.

A System for Monitoring Channel Quality with Mirror Receivers

Figure 5:
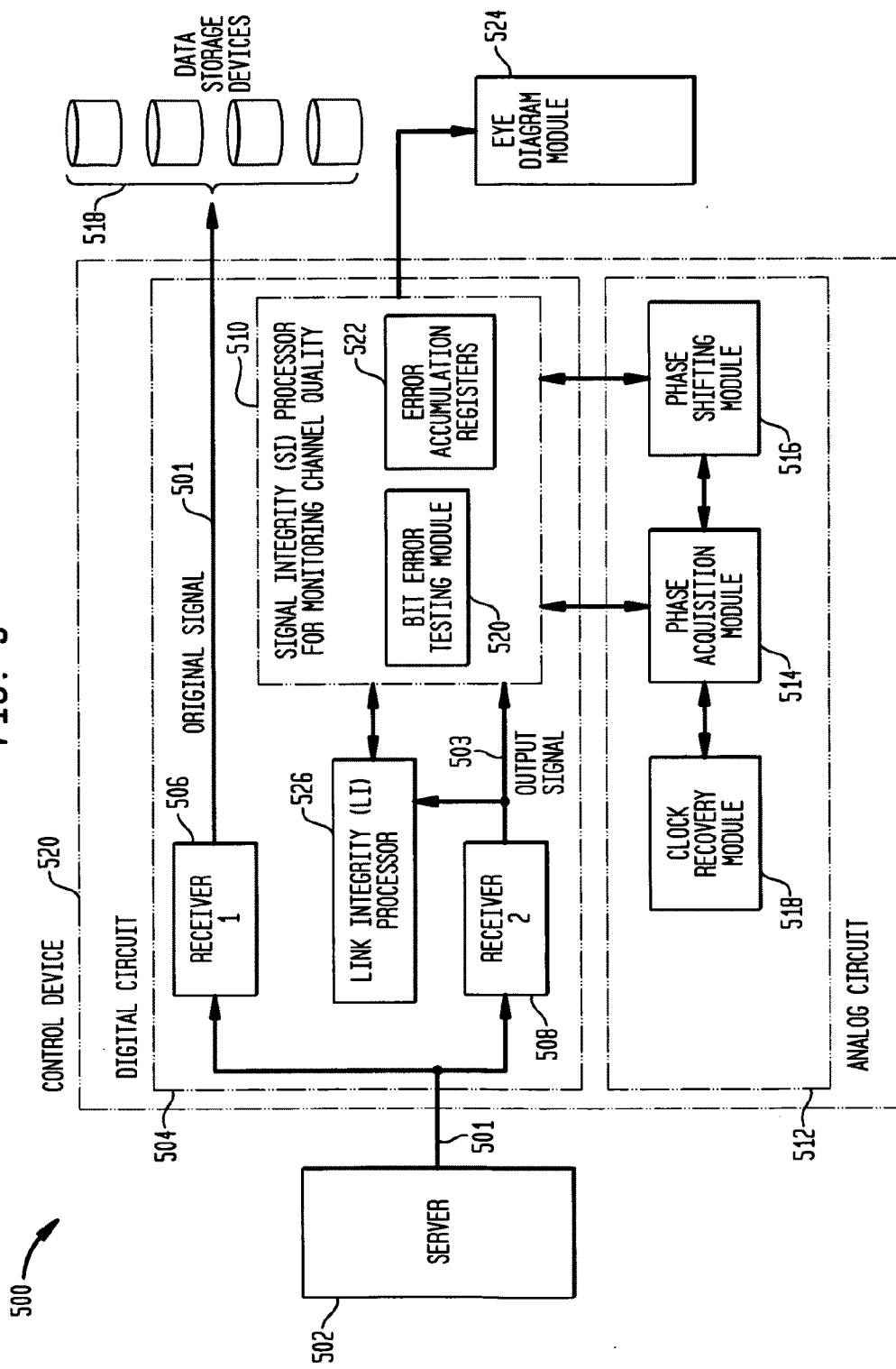
FIG. 5 illustrates a high-level diagram of a system for monitoring communications channel quality with mirror receivers, in accordance with an embodiment of the present invention.

FIG. 5 illustrates a high-level diagram of a system for monitoring the quality of a communications channel with mirror receivers, in accordance with an embodiment of the present invention. A communications system 500 having a network-attached storage configuration is shown in FIG. 5.

In FIG. 5, communications system 500 includes a server 502 coupled to a control device 520, which is coupled to a bank of data storage devices 518. Control device 520 intelligently connects data storage devices 518 onto various server paths. While communications system 500 is depicted as a uni-directional communications system, the invention is not, however, limited to this example configuration. Based on the description herein, one skilled in the relevant art(s) will understand that the invention can also have a bi-directional configuration.

In FIG. 5, control device 520 includes a digital circuit 504 and an analog circuit 512. According to an embodiment of the present invention, digital circuit 504 contains mirror receivers, a first receiver 506 and a second receiver 508, coupled to receive an original data signal 501 transmitted by server 502. Second receiver 508 generates an output signal 503. A signal integrity (SI) processor 510 is coupled to receive output signal 503 and manipulates output signal 503 in order to monitor the quality of the communications channel.

SI processor 510 is coupled in communication with analog circuit 512. Analog circuit 512 contains a phase acquisition module 514 coupled in communication with SI processor 510. When triggered by SI processor 510, phase acquisition module 514 locks onto output signal 503 to establish a zero reference phase (analogous to center 222 of eye 220 of FIG. 2B). A clock recovery module 518 is coupled in communication with phase acquisition module 514 to aid in synchronizing bits of output signal 503 with an embedded clock signal. A phase shifting module 516 is also coupled in communication with phase acquisition module 514 and SI processor 510. When triggered by SI processor 510, phase shifting module 516 shifts a phase of output signal 503 to a sampling phase position (analogous to a phase position to the left or right of center 222 of eye 220 of FIG. 2B) shifted relative to the zero reference phase.

SI processor 510 samples the phase-shifted version of the output signal generated by phase shifting module 516, and analyzes the phase-shifted version of the output signal bit-by-bit for bit errors. In an embodiment, SI processor 510 further includes a bit error testing module 520 that compares bits of the phase-shifted version of the output signal to a pattern signal in order to detect bit errors. SI processor 510 can further include error accumulation registers 522 for storing a number of bits detected and a number of bit errors so that SI processor 510 can estimate a communications channel quality measurement according to the accumulated number of bit errors relative to the accumulated number of bits detected. The communications channel quality measurement can be an estimated BER.

In an embodiment of the present invention, communications system 500 further includes a module 524, coupled in communication with SI processor 510, for enabling a system operator to visualize the quality of the communications channel. Module 524 can generate an eye diagram, which is indicative of the quality of the communications channel, extracted from output signal 503 by SI processor 510. Communications system 500 can also include a Link Integrity (LI) processor 526 coupled in communication with SI processor 510. LI processor 526 detects link-level errors in output signal 503 and aids SI processor 510 in estimating the quality of the communications channel.

When SI processor 510 discontinues sampling, it triggers phase acquisition module 514 to reestablish the zero reference phase. SI processor 510 then triggers phase shifting module 516 to either shift the phase of output signal 503 back to the previous sampling phase position or to a new sampling phase position. The mirror receiver configuration of communications system 500 is advantageous because SI processor 510 manipulates output signal 503 in order to extract a communications channel quality measurement, and thus does not disturb the integrity of original data signal 501.

CONCLUSION

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific ICs, processors executing appropriate software and the like or any combination thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for monitoring the quality of a communications channel, comprising:
receiving a data signal transmitted over the communications channel at an electronic receiver;
processing said data signal to produce an output signal;
phase-shifting said output signal to produce a phase-shifted version of said output signal having a phase shifted relative to a reference phase; and
detecting bit errors by sampling said phase-shifted version of said output signal, thereby monitoring the quality of the communications channel.

2. The method of claim 1, wherein said step of phase-shifting comprises synchronizing data bits of said output signal with a clock signal embedded in said output signal.

3. The method of claim 1, wherein said step of detecting includes accumulating a count of detected bits and a count of said bit errors, and estimating the communications channel quality according to said count of said bit errors relative to said count of detected bits.

4. The method of claim 1, wherein said step of detecting includes comparing bits of said phase-shifted version of said output signal to bits of a pattern signal.

5. The method of claim 1, wherein said step of detecting includes detecting link-level errors in said phase-shifted version of said output signal.

6. The method of claim 1, further comprising the step of enabling a system operator to visualize the quality of the communications channel.

7. The method of claim 6, further comprising generating an eye diagram from said phase-shifted version of said output signal to characterize the quality of the communications channel.

8. A method for monitoring the quality of a communications channel, comprising:
   receiving a data signal transmitted over the communications channel at an electronic receiver;
   generating first and second output signals based on said received data signal;
   manipulating said second output signal to monitor the quality of the communications channel without disrupting said first output signal, wherein said step of manipulating includes phase shifting said second output signal to generate a phase-shifted version of said second output signal; and
   comparing bits of said phase-shifted version of said second output signal to bits of a pre-defined pattern signal, thereby monitoring the quality of the communications channel.

9. The method of claim 8, wherein said step of manipulating includes the steps of:
   detecting bit errors by sampling said phase-shifted version of said second output signal;
   accumulating a count of detected bits and a count of said bit errors; and
   estimating the communications channel quality according to said count of said bit errors relative to said count of detected bits.

10. The method of claim 9, further comprising the step generating an eye diagram from said second output signal to characterize the quality of the communications channel.

11. The method of claim 9, further comprising the step of detecting link-level errors in said second output signal.

12. The method of claim 8, wherein said step of phase-shifting comprises synchronizing data bits of said second output signal with a clock signal embedded in said second output signal.

* * * * *